United States Patent Office 3,109,040
Patented Oct. 29, 1963

3,109,040
PREPARATION OF TERMINALLY UNSATURATED OLEFINS FROM ALIPHATIC CARBOXYLIC ACIDS
Richard J. Lee, Park Forest, Ill., assignor to Armour and Company, Chicago, Ill., a corporation of Delaware
No Drawing. Filed May 23, 1960, Ser. No. 30,758
14 Claims. (Cl. 260—681)

This invention relates to olefins and to a method for their preparation. It is more specifically related to methods for the production of terminally unsaturated olefins from fatty acids and from symmetrical and unsymmetrical anhydrides of fatty acids.

The present application is a continuation-in-part of my co-pending application Serial No. 684,655, filed September 18, 1957, and now abandoned.

It has now been discovered that fatty acids can be pyrolyzed in such a manner that the carboxyl group is removed and the remaining aliphatic chain is unchanged except for the introduction of a double bond between the terminal and adjacent carbon atom. In other words the double bond of the resulting olefin, with reference to the original fatty acid, is introduced between the two carbon atoms situated next to the carboxyl group of the fatty acid.

In the process of the invention fatty acids are dissolved in a solvent such as acetic anhydride or toluene, which is capable of action as a homogeneous catalyst in the pyrolysis reaction. The solution of fatty acid in catalyst is then vaporized by heating. The actual pyrolysis reaction takes place in a reaction or pyrolysis chamber through which the vapors are passed after they are formed in the vaporizing zone of the pyrolysis chamber. In the reaction zone or pyrolysis chamber the mixed vapors are brought to an elevated temperature.

In carrying out the process of this invention I found it desirable to use a vertically positioned tube loosely packed with porcelain chips, quartz chips, heat-resistant glass chips or other inert materials. In a particular embodiment of the apparatus I have used a vertically positioned quartz tube packed with quartz chips. The packing materials of this reaction zone are utilized simply as a means of transferring heat to the vapors and are not otherwise necessary to the reaction. An electric heating jacket is placed about the tube and is so designed as to control the temperature of the tube in three separate zones, the first and upper zone being termed the vaporizing zone, the middle zone being the pyrolysis reaction zone, and the third and lower zone being the cooling zone wherein the vapors are cooled so as to be readily condensable upon their exit from the quartz tube. The period during which the vapors are in the reaction zone is termed "the resident time" of the reaction. The resident time is dependent upon the efficiency of the pyrolysis chamber in bringing the vapors to an elevated temperature a which they may be pyrolyzed. In the examples of the present case wherein the exhaust flow of non-condensable gases from the apparatus is approximately 3 to 4 ml. per second, the resident time of the vapors in the reaction zone is generally less than one minute depending upon the volume of the reaction tube.

In carrying out the reaction fatty acids and homogeneous catalysts are charged into the vaporizing zone through an inlet at the top of the quartz tube. Gaseous nitrogen is also introduced through the same upper opening. As a solution of fatty acid and catalyst impinges upon the quartz chips in the upper or vaporizing zone the temperature of the solution is immediately raised and vapors are formed. These vapors then pass downward into the pyrolysis reaction zone which is heated to a temperature at which the reaction is to be run. As the vapors pass downward through the pyrolysis zone they are converted to olefins.

In the lower zone which is maintained at a lower temperature than that at which the reaction takes place, the gases are cooled so as to be readily condensable upon leaving the tube. Upon leaving the quartz tube the gases are passed into a condensing chamber surrounded by ice. In this chamber the liquids consisting chiefly of olefins, the fatty acid and catalyst are condensed. The materials not condensed in the first condensation chamber are passed into a second chamber surrounded by liquified nitrogen. In this chamber all condensable gases are condensed and collected. The non-condensable gases are passed from the second condensing chamber through an exhaust system. The rate of exhaust of the non-condensable gases is measured. It is desirable of course to sample these gases or to collect them in order that they may be analyzed. The resident time of the vapors in the middle or pyrolysis zone is controlled by the rate at which the non-condensable gases are removed from the system.

As indicated above I have found it desirable in many instances to intermix the vapors of fatty acid and catalyst with gaseous nitrogen or other inert gas such as carbon dioxide, argon, helium, etc., in order to efficiently control the velocity of the vapors through the pyrolysis chamber, and thereby to control the resident time of the reactants in the pyrolysis chamber.

The homogeneous catalyst for the process should be one which will be in the same physical state as the fatty acid at the temperatures employed in the pyrolysis reaction. Illustrative examples of such homogeneous catalysts are benzene, toluene, dimethylbenzene, ethylbenzene, symmetrical and unsymmetrical acid anhydride of the formula

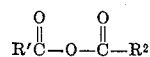

wherein R' and R² are alkyl radicals having less than 6 carbon atoms, and acids of the formula $RCO_2H$ wherein R is an alkyl group having less than 6 carbon atoms. The presence of such a homogeneous catalyst results in the production of the specific olefins, the terminally unsaturated olefins, for which the process of this invention is used.

It is indicated that this reaction does not proceed by means of a radical chain mechanism. The aliphatic acids which may be subjected to the present process include all the commonly known aliphatic carboxylic acids having 3 or more carbon atoms. The process is especially well adapted to preparing olefins from acids which may be used in the process therefore include such saturated acids as stearic acid, lauric acid, caprylic acid, propionic acid, tetracosanoic acid, (lignoceric acid), and triacontanoic acid (melissic acid); the group also includes the mono-unsaturated acids such as oleic acid, palmitoleic acid, ricinoleic acid, 9-eicosenic acid (gadoleic acid), 13-docosenoic acid (erucic acid), 11-dotosenoic acid (cetoleic acid); and the polyunsaturated acids, such as linoleic acid, linolenic acid and α and β elaeosteric acid. The process has been found to be particularly valuable in connection with the naturally occurring fatty acids having from 12 to 20 carbon atoms, some of which are listed above;

It is particularly surprising that by the present process unsaturated fatty acids may be pyrolyzed without disturbing the geometrical position of the double bond that may be present in the fatty acid molecule. Thus by the present process it is possible to pyrolyze oleic acid which is unsaturated in the 9 position to produce 1,8-heptadecadiene. The double bonds present in the fatty acid are not disturbed. It is also notable that in the present process the geometric isomerism of the unsaturated molecule is not changed, i.e. it is not transformed from cis to trans or vice versa. In the olefin resulting from such unsaturated fatty acids there is simply introduced an additional double bond in the terminal position of the resulting olefin.

The use of heterogeneous catalysts has been common in the prior art pyrolysis processes. The heretogeneous catalyst includes such varied materials as acid clay, silica gel, $Al_2O_3$, bentonite, hydroxides and oxides of Th, V, Ce, Ni, Co, Fe, and many other surface active catalysts. As a result of such surface or heterogeneous catalysis, the pyrolysis of fatty acids by the prior art processes has resulted in the production of many degradation products, such as paraffins, various olefins, ketones, and ketenes, water, carbonic acid, etc. The production of ketones we have discovered is the result only of surface or heterogeneous catalysis. In the process of the present invention I avoid heterogeneous catalysis and as a result ketones are not produced by the pyrolysis reaction of the present invention.

In the specific process of the invention fatty acids are dissolved in a homogeneous catalyst such as acetic anhydride. This mixture is then introduced into the tube where it is immediately vaporized upon contacting the heated materials in the upper portion of the reaction tube. The vapors are drawn downward through the chamber, by reason of the flow of nitrogen and the continuing exhausting from the system of non-condensable gases and the condensing of condensable fractions. In the reaction zone or middle zone the vapors are heated to within the range of from about 350° C. to 700° C. We have found that the temperatures of about 350° C. to 500° C. are desirable in the pyrolysis of the lower molecular weight acids. Temperatures of from 500° C. to 700° C. are more generally applicable to the higher fatty acids having 6 or more carbon atoms. For the higher fatty acids, those having 6 or more carbon atoms, we have found a temperature of about 600° to be preferable. As indicated above it has been found desirable in this process to introduce some gaseous nitrogen or other inert gas into the vapors of the upper portion of the reaction to control the velocity of the gases through the reaction. The principal products of the reaction are terminally unsaturated olefin, unreacted fatty acid, acetic acid and non-condensable gases.

The terminally unsaturated olefins produced by the process of the present invention provide a good starting material for the production of secondary sulfuric acid alkyl ester salts, these latter compounds being good detergent materials. Furthermore, other uses for these olefins is in the production of products destined for use as lubricating oil additives, i.e. calcium alkylsalicylates.

The process of the present invention may be illustrated by the following examples:

*Example I*

In the preparation of terminally unsaturated heptadecene (1-heptadecene) 10 g. of stearic anhydride (85% pure) was dissolved in 40 ml. of toluene. This solution was then charged into the upper portion of (the vaporizing zone) of the quartz tube packed with quartz chips. Gaseous nitrogen was also introduced into the tube with the solution of fatty acid derivative and toluene. The temperature in the upper or vaporizing zone was maintained at approximately 500° C. while the temperature of the middle or reaction zone was maintained at a temperature of approximately 600° C. The reaction tube (total volume of 420 cc.) into which the vapors were introduced had an effective volume of approximately 270 cc. The effective volume of any given tube varies according to the particle size of the packing material. The flow rate of the vapors and nitrogen through the reaction zone was controlled at 4 ml. per second at the exhaust of the system. This rate was calculated to provide a resident time of the reactants in the pyrolysis zone of approximately 67 seconds. The products were collected and separated and 2 g. terminally unsaturated olefin (98% pure) was isolated. The total olefin conversion based on the stearic anhydride decomposed was 46.5% of the theoretical yield.

*Example II*

In another preparation of 1-heptadecene, 10 g. of stearic acid was dissolved in 50 ml. of acetic anhydride. This solution was then charged along with gaseous nitrogen into a reaction tube as described in Example I. The solution was thereby vaporized and passed into the reaction zone of the pyrolysis tube. The vapors and gaseous nitrogen were heated to a temperature of about 600° C. In this system the rate of flow of the exhaust of the reaction system was held between 3 and 4 ml. per second to provide a resident time of approximately 60 seconds. The principal products of this pyrolysis reaction was found to be terminally unsaturated olefin, acetic acid and uncondensable gases. The products of the reaction were then separated and 5.5 g. of terminally unsaturated olefin were recovered. Analysis showed this olefin to be 98% pure. Infrared absorption showed the product to be identical to previously identified $C_{17}H_{34}$ terminally unsaturated olefin. The conversion of fatty acid to olefin by this process resulted in a yield which was equal to 66.2% of the theoretical yield.

*Example III*

In the preparation of 1,8-heptadecadiene 30 g. of oleic acid (9-octadecenoic acid 90% pure) was dissolved in 100 cubic centimeters of acetic anhydride. The solution was then charged along with gaseous nitrogen into a reaction tube as described in Example I. The vapor and nitrogen were heated to a temperature of about 600° C. in the reaction zone of the column. The exhaust flow was at a rate of 12 cc./sec. which is equivalent to approximately 22 seconds' resident time. The principal products were acetic acid, olefins, oleic acid and acetic anhydride, and non-condensable gases. The yield of the terminally unsaturated olefin was 22% based on olefin recovered. Infrared identification showed no trans-isomerization of original double bond in oleic acid.

In the preparation of 1,8-pentadecadiene, palmitoleic acid is reacted according to the same procedure as described above in connection with oleic acid.

*Example IV*

15 cc. of 10-undecenoic acid (approximately 90% pure) dissolved in 50 cc. of acetic anhydride was pyrolyzed at 620° C. under a constant flow of nitrogen (20 cc./min.). The product, collected and separated, yielded approximately 2.1 grams of diterminally-unsaturated olefin (1,10-decadiene). Infrared analysis showed only terminal unsaturation. The yield of olefin based on total conversion to olefin is 23% of theory.

*Example V*

Seven grams of linoleic acid (9,12-octadecadienoic acid) was dissolved in 50 ml. of acetic anhydride and pyrolyzed at 615° C. in the presence of a constant flow of nitrogen. The rate of flow at the exhaust was measured at 150 cc./min. throughout the experiment. The amount of hydrocarbon collected after purification on silicic acid columns weighed 0.5 gram, corresponding to a yield of 8.6% based on total conversion of acid to olefin (1,8,11-heptadecatriene). Ultraviolet absorption indicates no conjugation, and infrared absorption indicated isolated internal double bonds with the addition of the terminal-unsaturation characteristics.

*Example VI*

Linoleic acid (9,12-octadecadienoic acid) was treated with KOH in diethylene glycol. The conjugation of double bonds was shown to be 74% of theory by ultraviolet absorption analysis. Eleven grams of this material was dissolved in acetic anhydride and pyrolyzed at 600° C. under a constant flow of nitrogen at a rate of 150 cc./min. The exhaust rate was held at 300 cc./min. throughout the experiment. After separation and purification, 1 gram of olefin was obtained. This is equivalent to a 10.9% conversion of theory. Infrared analysis indicated conjugation of double bonds and the presence of terminal unsaturation. Also, some aromatic substance was detected and confirmed by ultraviolet absorption. This aromatic substance was detected and confirmed by ultraviolet absorption. This aromatic compound is characteristic of the cyclophanes and constitutes a small portion of the olefin sample which are primarily 1,8,10-heptadecatriene and 1,9,11-heptadecatriene.

*Example VII*

Ricinoleic acid (12-hydroxy-9-octadecenoic acid) was acylated with acetic anhydride and the acetoxyricinoleic acid was vacuum distilled. Twelve grams of the ester (approximately 80% pure) was dissolved in 50 cc. of acetic anhydride and pyrolyzed at 630° C. under a constant stream of nitrogen (150 cc./min.). The exhaust was held at a flow rate of 250 cc./min. throughout the experiment. The purified olefin obtained from the pyrolysate was one gram. This corresponds to a yield of 12% of theory. Infrared analysis indicated aromaticity, conjugation of double bonds, and terminal unsaturation. Ultraviolet absorption showed the sample to be a mixture of aliphatic and aromatic olefins; cyclophane, and 1,8,10-heptadecatriene.

While the invention has been illustrated in specific detail in the foregoing specification and examples, it will be apparent that the invention is susceptible of many variations and modifications all of which are within the spirit and scope of the invention and of the following claims.

I claim:

1. The method of converting an aliphatic carboxylic acid to a terminally unsaturated olefin which comprises the steps of dissolving said acid in a homogeneous pyrolysis catalyst whereby a solution of acid and homogeneous pyrolysis catalyst is formed, vaporizing said solution, and passing the vapors of said solution through a pyrolytic reaction zone, said homogeneous pyrolysis catalyst being one which is in the same physical state as the said acid at the temperatures employed in the said pyrolytic reaction zone, said method being conducted in the absence of heterogeneous catalysts.

2. The method of converting an aliphatic carboxylic acid to a terminally unsaturated olefin which comprises the steps of dissolving said acid in a homogeneous pyrolysis catalyst selected from the group consisting of benzene, toluene, dimethylbenzene, ethylbenzene, symmetrical and unsymmetrical acid anhydrides having the formula

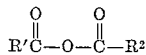

wherein R' and R² are alkyl radicals having less than 6 carbon atoms, and acids of the formula $RCO_2H$ wherein R is an alkyl group having less than 6 carbon atoms whereby a solution of acid and homogeneous pyrolysis catalyst is formed, vaporizing said solution, and passing the vapors of said solution through a pyrolytic reaction zone, said method being conducted in the absence of heterogeneous catalysts.

3. The method of converting aliphatic hydrocarbon carboxylic acids to terminally unsaturated olefins which comprises the steps of dissolving said acids in a homogeneous pyrolysis catalyst whereby a solution of said homogeneous pyrolysis catalyst is formed, vaporizing said solution, and passing the vapors of said solution through a pyrolytic reaction zone whereby said carboxylic acids are decarboxylated whereby of form an olefin having a double bond in the terminal position of the resulting aliphatic chain, said homogeneous pyrolysis catalyst being one which is in the same physical state as the said acid at the temperatures employed in the said pyrolytic reaction zone, said method being conducted in the absence of heterogeneous catalysts.

4. The method of converting an aliphatic carboxylic acid to a terminally unsaturated olefin which comprises the steps of dissolving an aliphatic carboxylic acid in a homogeneous pyrolysis catalyst whereby a solution of aliphatic carboxylic acid and homogeneous pyrolysis catalyst is formed, vaporizing said solution, and passing the vapors of said solution through a pyrolytic reaction zone wherein said vapors are brought to a temperature within the range from about 350° C. to 700° C., said homogeneous pyrolysis catalyst being one which is in the same physical state as the said acid at the temperatures employed in the said pyrolytic reaction zone, said method being conducted in the absence of heterogeneous catalysts.

5. The method of converting an aliphatic carboxylic acid to a terminally unsaturated olefin which comprises the steps of dissolving an aliphatic carboxylic acid in a homogeneous pyrolysis catalyst whereby a solution of aliphatic carboxylic acid and homogeneous pyrolysis catalyst is formed, vaporizing said solution, intermixing the vapors of said solution with an inert gas and passing said inert gas and said vapors of said solution through a pyrolytic reaction zone wherein said vapors and said inert gas are brought to a temperature of from within the range of about 350° C. to about 700° C., said homogeneous pyrolysis catalyst being one which is in the same physical state as the said acid at the emperatures employed in the said pyrolytic reaction zone, said method being conducted in the absence of heterogeneous catalysts.

6. The process of claim 5 wherein said homogeneous pyrolysis catalyst is acetic anhydride.

7. The process of claim 5 wherein said inert gas is nitrogen.

8. The process of claim 5 wherein said inert gas is nitrogen and wherein said homogeneous pyrolysis catalyst is selected from the group consisting of benzene, toluene, dimethylbenzene, ethylbenzene, compounds of the formula

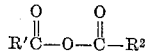

wherein R' and R2 are alkyl groups having less than 6 carbon atoms and compounds of the formula $RCO_2H$ wherein R is an alkyl group having less than 6 carbon atoms.

9. A process for the conversion of an unsaturated fatty acid to a terminally unsaturated olefin which comprises the steps of dissolving said unsaturated fatty acid in a homogeneous pyrolysis catalyst whereby a solution of fatty acid and homogeneous pyrolysis catalyst is formed, vaporizing said solution, and passing the vapors of said solution through a pyrolytic reaction zone whereby said fatty acids are decarboxylated to form an olefin having a double bond in the terminal position of the aliphatic chain without affecting the geometric isomerism of the double bond present in the original fatty acid, said homogeneous pyrolysis catalyst being one which is in the same physical state as the said acid at the temperatures employed in the said pyrolytic reaction zone, said method being conducted in the absence of heterogeneous catalysts.

10. The process of claim 9 wherein said homogeneous pyrolysis catalyst is acetic anhydride and wherein said vapor of said solution are intermixed with an inert gas when passed through said pyrolytic reaction zone.

11. A process for the conversion of an unsaturated fatty acid selected from the group consisting of palmitoleic acid, oleic acid, ricinoleic acid and linoleic acid which comprises the steps of dissolving said unsaturated fatty acid in a homogeneous pyrolysis catalyst whereby a solution of fatty acid and homogeneous pyrolysis catalyst is formed, vaporizing said solution, and passing the vapors of said solution through a pyrolytic reaction zone whereby said fatty acids are decarboxylated to form an olefin having a double bond in the terminal position of the aliphatic chain without affecting the geometric isomerism of the double bond present in the original fatty acid, said homogeneous pyrolysis catalyst being one which is in the same physical state as the said acid at the temperatures employed in the said pyrolytic reaction zone, said method being conducted in the absence of heterogeneous catalysts.

12. The method of preparing 1,8-heptadecadiene comprising the steps of dissolving 9-octadecenoic acid in a homogeneous pyrolysis catalyst whereby a solution of oleic acid and homogeneous pyrolysis catalyst is formed, vaporizing said solution, and passing the vapors of said solution through a pyrolytic reaction zone wherein said vapors are brought within a temperature range of from about 350° C. to about 700° C., said homogeneous pyrolysis catalyst being one which is in the same physical state as the said acid at the temperatures employed in the said pyrolytic reaction zone, said method being conducted in the absence of heterogeneous catalysts.

13. The process of claim 10 wherein said homogeneous pyrolysis catalyst is acetic anhydride.

14. The method of preparing terminally unsaturated triolefins having 3 double bonds and being of the formula $C_nH_{2n}-4$, wherein $n$ is equal to the number of carbon atoms in the compound of said formula, from linoleic acid comprising the steps of dissolving linoleic acid in a homogeneous pyrolysis catalyst whereby a solution of linoleic acid and homogeneous pyrolysis catalyst is formed, vaporizing said solution and passing the vapor of said solution through a pyrolytic reaction zone wherein said vapors are brought to within a temperature range of from about 350° C. to about 700° C., said homogeneous pyrolysis catalyst being one which is in the same physical state as the said acid at the temperatures employed in the said pyrolytic reaction zone, said method being conducted in the absence of heterogeneous catalysts.

References Cited in the file of this patent

UNITED STATES PATENTS 1,988,021    Schmidt et al. _____ Jan. 15, 1935

FOREIGN PATENTS 391,113    Great Britain _____ Apr. 10, 1933

OTHER REFERENCES

Egloff: "Physical Constants of Hydrocarbons," published by Reinhold (New York), (1953), vol. V, page 450 relied on.